United States Patent
Iba et al.

(10) Patent No.: US 12,311,946 B2
(45) Date of Patent: May 27, 2025

(54) VEHICLE CONTROL DEVICE, VEHICLE CONTROL METHOD, AND VEHICLE CONTROL SYSTEM

(71) Applicant: Hitachi Astemo, Ltd., Hitachinaka (JP)

(72) Inventors: Tatsuya Iba, Hitachinaka (JP); Kentaro Ueno, Hitachinaka (JP); Daisuke Noma, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 183 days.

(21) Appl. No.: 18/021,714

(22) PCT Filed: Aug. 5, 2021

(86) PCT No.: PCT/JP2021/029138
§ 371 (c)(1),
(2) Date: Feb. 16, 2023

(87) PCT Pub. No.: WO2022/054473
PCT Pub. Date: Mar. 17, 2022

(65) Prior Publication Data
US 2023/0322224 A1  Oct. 12, 2023

(30) Foreign Application Priority Data

Sep. 8, 2020  (JP) .................................. 2020-150567

(51) Int. Cl.
*B60T 8/32* (2006.01)
*B60W 30/18* (2012.01)
(Continued)

(52) U.S. Cl.
CPC ....... *B60W 30/18127* (2013.01); *B60T 8/321* (2013.01); *B60W 2050/0056* (2013.01); *B60W 2710/18* (2013.01)

(58) Field of Classification Search
CPC .... B60T 8/32; B60T 7/12; B60T 1/10; B60W 20/00; B60W 10/18; B60W 10/08; B60L 7/24; B60L 7/26; B60L 58/16
See application file for complete search history.

(56) References Cited

U.S. PATENT DOCUMENTS

| | | | |
|---|---|---|---|
| 6,086,166 A | 7/2000 | Fukasawa | |
| 11,718,181 B2* | 8/2023 | Yamamoto | ................ B60T 1/10 701/70 |

(Continued)

FOREIGN PATENT DOCUMENTS

| | | |
|---|---|---|
| DE | 10 2011 054 290 A1 | 4/2013 |
| JP | 2006-311791 A | 11/2006 |

(Continued)

OTHER PUBLICATIONS

International Search Report (PCT/ISA/210) issued in PCT Application No. PCT/JP2021/029138 dated Oct. 26, 2021 with English translation (five (5) pages).

(Continued)

*Primary Examiner* — Tan Q Nguyen
(74) *Attorney, Agent, or Firm* — Crowell & Moring LLP

(57) ABSTRACT

A vehicle control device, a vehicle control method, and a vehicle control system according to the present invention estimate, in response to a deceleration command to a vehicle, the first deceleration generated by a frictional braking force based on characteristics of deceleration with respect to a force acting on a friction pad of a frictional braking device, determine the second deceleration by subtracting the first deceleration from the deceleration command, output the first command for generating the frictional braking force based on the deceleration command, and output the second command for generating the regenerative braking force based on the second deceleration. This allows compensating for uncertainty in achieving deceleration by (Continued)

frictional braking, and improving the accuracy of the actual deceleration with respect to the deceleration command.

14 Claims, 12 Drawing Sheets

(51) Int. Cl.
*B60W 10/18* (2012.01)
*B60W 50/00* (2006.01)

(56) References Cited

U.S. PATENT DOCUMENTS

| | | |
|---|---|---|
| 2004/0054450 A1 | 3/2004 | Nakamura et al. |
| 2004/0108771 A1 | 6/2004 | Tsunehara |
| 2006/0220453 A1 | 10/2006 | Saito et al. |
| 2012/0136547 A1* | 5/2012 | Miyazaki ............... B60L 3/108 701/70 |
| 2013/0090824 A1* | 4/2013 | Garbe .................. B60W 10/08 701/70 |
| 2014/0074369 A1* | 3/2014 | Kim ...................... B60L 7/26 701/70 |
| 2016/0325628 A1 | 11/2016 | Okano et al. |
| 2023/0219542 A1* | 7/2023 | Yamamoto ............ B60W 20/14 701/70 |

FOREIGN PATENT DOCUMENTS

| | | |
|---|---|---|
| JP | 2009-278840 A | 11/2009 |
| JP | 2015-140080 A | 8/2015 |
| JP | 2019-98839 A | 6/2019 |

OTHER PUBLICATIONS

Japanese-language Written Opinion (PCT/ISA/237) issued in PCT Application No. PCT/JP2021/029138 dated Oct. 26, 2021 (five (5) pages).

International Preliminary Report on Patentability (PCT/IB/338 & PCT/IB/373) issued in PCT Application No. PCT/JP2021/029138 dated Mar. 23, 2023, including English translation of document C2 (Japanese-language Written Opinion (PCT/ISA/237) filed on Feb. 16, 2023) (14 pages).

Extended European Search Report issued in European Application No. 21866433.2 dated Feb. 19, 2024 (11 pages).

* cited by examiner

VEHICLE CONTROL DEVICE, VEHICLE CONTROL METHOD, AND VEHICLE CONTROL SYSTEM

TECHNICAL FIELD

The present invention relates to a vehicle control device, to a vehicle control method, and to a vehicle control system.

BACKGROUND ART

A braking control apparatus disclosed in Patent Document 1 is used for a vehicle that comprises a second motor for imparting a driving force or an effective regenerative braking force BPR to a vehicle, and a hydraulic braking system for imparting an effective hydraulic braking force BPP to the vehicle by adjusting the hydraulic pressure within a wheel cylinder provided for a wheel. When the effective hydraulic braking force BPP is reduced based on a reduction in a brake operation amount Y, the braking control apparatus performs a correction process for reducing the effective regenerative braking force BPR that is being imparted to the vehicle by the second motor.

REFERENCE DOCUMENT LIST

Patent Document

Patent Document 1: JP 2015-140080 A

SUMMARY OF THE INVENTION

Problem to be Solved by the Invention

Deceleration by frictional braking has a limit to the responsiveness and accuracy. Accordingly, when minute decelerations are repeated or a sudden deceleration takes place, a transient error occurs between an actual deceleration and a deceleration command value due to a response delay in the frictional braking.

Also, when a deceleration command of a specific magnitude or greater continues, a steady error may occur between the actual deceleration and the deceleration command value due to the non-linearity of the frictional braking force.

The present invention has been made in view of such conventional circumstances, and an object thereof is to provide a vehicle control device, a vehicle control method, and a vehicle control system that can compensate for the uncertainty in achieving deceleration by frictional braking to improve the accuracy of an actual deceleration with respect to a deceleration command in a vehicle equipped with a regenerative braking device and a frictional braking device.

Means for Solving the Problem

According to one aspect of the present invention, in response to a deceleration command to a vehicle, a first deceleration generated by a frictional braking force is estimated based on characteristics of deceleration with respect to a force acting on a friction pad of a frictional braking device, a second deceleration is determined by subtracting the first deceleration from the deceleration command, a first command for generating the frictional braking force is output based on the deceleration command, and a second command for generating a regenerative braking force is output based on the second deceleration.

Effects of the Invention

According to the present invention, it is possible to compensate for the uncertainty in achieving deceleration by frictional braking and to improve the accuracy of an actual deceleration with respect to a deceleration command.

MODE FOR CARRYING OUT THE INVENTION

Hereinafter, an embodiment of a vehicle control device, a vehicle control method, and a vehicle control system according to the present invention will be described with reference to the drawings.

Figure 1:
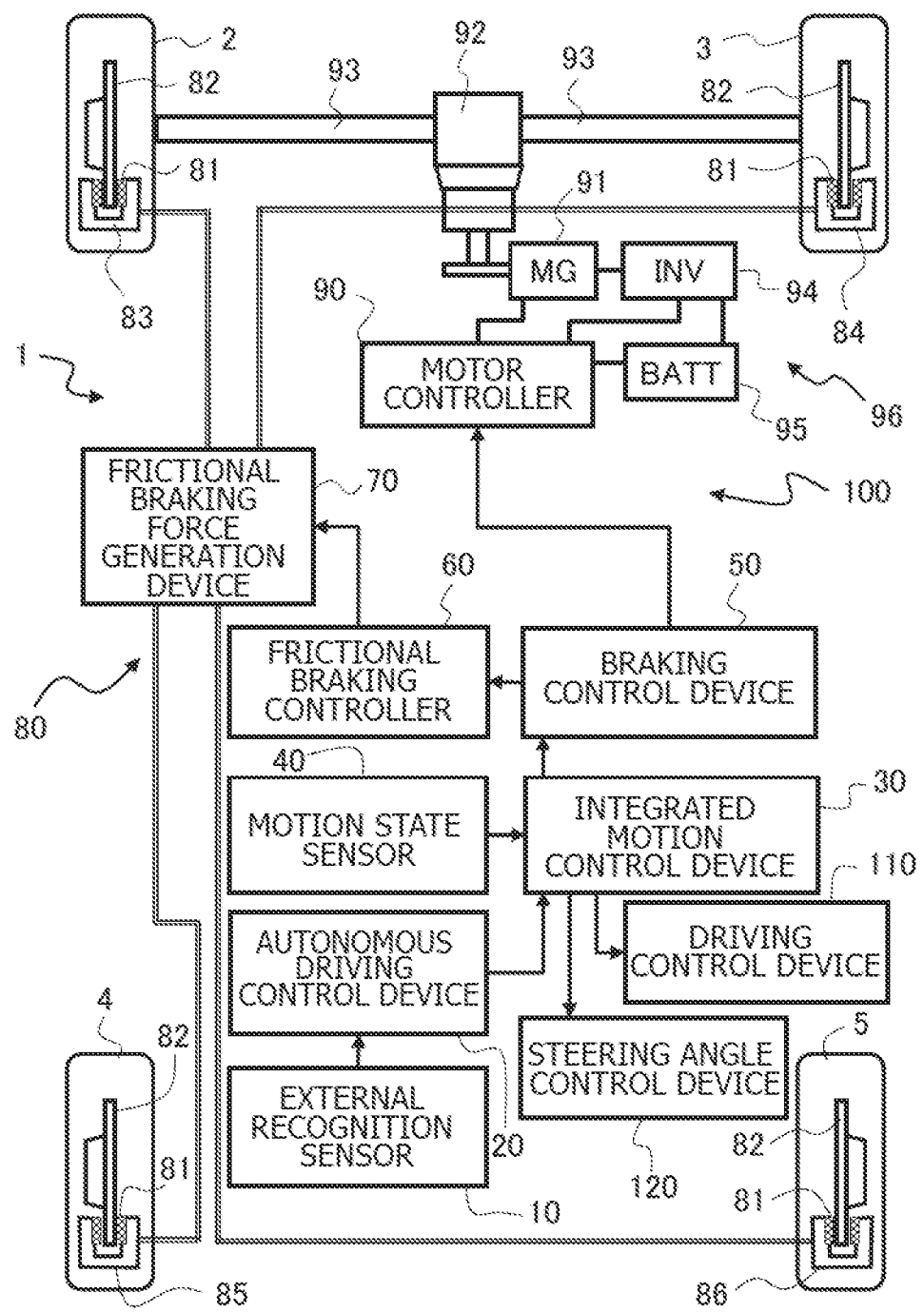
FIG. 1 is a block diagram illustrating a configuration of a vehicle control system.

FIG. 1 is a block diagram illustrating a vehicle control system 100 provided for a vehicle 1 that is configured to be capable of automatic driving.

An external recognition sensor 10 acquires road information of a road in front of vehicle 1 and external information such as information of an obstacle by a camera or a radar.

An autonomous driving control device 20 sets, based on external information acquired by external recognition sensor 10, information of targets for travelling in the automatic driving operation including a target travel track and a target driving speed.

An integrated motion control device 30 acquires information on the targets for travelling from autonomous driving control device 20 and also acquires information on the actual motion state of vehicle 1 from a motion state sensor 40.

Integrated motion control device 30 sets, based on the information on the targets for travelling and information on the actual motion state of vehicle 1, a braking control command, a driving control command, and a steering angle control command to make vehicle 1 to follow the targets for travelling.

Motion state sensor 40 detects the motion state of vehicle 1 such as a yaw rate, a vehicle body slip angle, a lateral acceleration, a longitudinal acceleration, and a wheel speed, and it outputs information related to the detected motion state to integrated motion control device 30.

A braking control device 50, a driving control device 110, and a steering angle control device 120 acquire the braking control command, the driving control command, and the steering angle control command that are output by integrated motion control device 30, and they control respectively a braking force, a driving force, and a steering angle based on each acquired control command.

Here, the braking control command output by integrated motion control device 30 is a deceleration command, in other words, data of a target deceleration, and the deceleration refers to a negative acceleration.

It should be noted, in the present application, that the magnitude of deceleration indicates the magnitude of the absolute value of deceleration, and that a state of large deceleration indicates a state of rapid deceleration, and a small deceleration indicates a state of slow deceleration.

Driving control device 110 controls a power source such as a motor generator 91 provided in vehicle 1 and an internal combustion engine (not shown) based on the driving control command from integrated motion control device 30 and adjusts the driving force of vehicle 1.

Steering angle control device 120 controls a steering device (not shown) based on the steering angle control command from integrated motion control device 30 and adjusts the traveling direction of vehicle 1.

The steering device described above is a device capable of automatically steering, and a typical example of this steering device is an electric power steering device with a motor for generating a steering force.

As described below, vehicle 1 includes, as braking devices, a regenerative braking device 96 for generating a regenerative braking force applied to wheels 2 and 3, and a frictional braking device 80 for generating a frictional braking force applied to wheels 2 to 5.

Braking control device 50 is a vehicle control device with a control unit for outputting a result of calculation based on input information, and a typical example of the control unit is a microcomputer.

Braking control device 50, which functions as a braking controller, outputs a first command (specifically, a hydraulic pressure command) for generating a frictional braking force to frictional braking device 80 and outputs a second command (specifically, a torque command) for generating a regenerative braking force to regenerative braking device 96.

Thus, braking control device 50 generates a braking force based on the braking control command from integrated motion control device 30 via coordinated control of frictional braking and regenerative braking.

It should be noted, however, that the electronic braking device with the functions of outputting the first command for generating a frictional braking force to frictional braking device 80 and outputting the second command for generating a regenerative braking force to regenerative braking device 96 is not limited to braking control device 50.

For example, integrated motion control device 30 may have a function of outputting the above first and second commands.

Frictional braking device 80 will be described in detail below.

Frictional braking device 80 comprises a frictional braking controller 60, a frictional braking force generation device 70, a friction pad 81, a disc rotor 82, and wheel cylinders 83 to 86. A unit that comprises friction pad 81, disc rotor 82, and wheel cylinders 83 to 86 is provided in each wheel 2 to 5.

Frictional braking controller 60 acquires the first command (in other words, a frictional braking command) from braking control device 50 and controls frictional braking force generation device 70 based on the acquired first command.

Frictional braking device 80 is a hydraulic frictional braking device that presses friction pad 81 against disc rotor 82 by hydraulic pressure (for example, oil pressure) and generates a frictional braking force applied to each wheel 2 to 5. Braking control device 50 outputs a hydraulic pressure command that correlates with the frictional braking force as the frictional braking command.

Frictional braking force generation device 70 is a hydraulic pressure adjustment device for controlling a hydraulic pressure supplied to wheel cylinders 83 to 86, one of which is provided for each of wheel 2 to 5. Frictional braking force generation device 70 can adjust the frictional braking force generated on each wheel 2 to 5 by controlling the hydraulic pressure.

It should be noted that frictional braking device 80 is not limited to a hydraulic type.

For example, frictional braking device 80 may be an electric type frictional braking device that applies thrust to a piston by an electric motor and then propels friction pad 81 by the piston so that friction pad 81 is pressed against disc rotor 82.

When frictional braking device 80 is a hydraulic type, the force of the hydraulic pressure to move the piston is a force acting on friction pad 81. When frictional braking device 80 is an electric type, the force of the electric motor to move the piston is a force acting on friction pad 81.

Next, regenerative braking device 96 will be described in detail.

Regenerative braking device 96 comprises a motor controller 90, a motor generator 91, an inverter 94, and a battery 95.

Motor controller 90 acquires the second command (in other words, a regenerative braking command) from braking control device 50 and acquires a driving command from driving control device 110, and it controls power running and regenerative running of motor generator 91 based on the acquired commands.

Motor generator 91 is a three-phase alternating current motor and is connected to a drive shaft 93 via a differential gear 92.

Motor generator 91 performs power running or regenerative running based on a command from motor controller 90 to generate a driving force or a regenerative braking force for wheels 2 and 3.

Inverter 94 converts, based on a power running command from motor controller 90, direct-current power from battery 95 into alternating-current power to supply the converted power to motor generator 91, thereby causing motor generator 91 to perform power running.

On the other hand, inverter 94 converts, based on a regenerative running command from motor controller 90, alternating-current power generated by motor generator 91 to direct-current power to charge battery 95, thereby causing motor generator 91 to perform regenerative running and to generate a regenerative braking force for wheels 2 and 3.

Here, when causing motor generator 91 to perform regenerative running and to generate the regenerative braking force, braking control device 50 gives a torque command related to the regenerative braking force to motor controller 90 as the second command.

It should be noted that motor generator 91 may be installed within the hub of each wheel 2 to 5 as an in-wheel motor so that a regenerative braking force is generated on all four wheels.

Vehicle 1 may be a hybrid vehicle that uses motor generator 91 and an internal combustion engine as a drive source, a hybrid vehicle that has an internal combustion engine for electricity generation, or an electric vehicle that does not comprise an internal combustion engine, in other words, does not comprise a drive source other than motor generator 91.

The configuration of braking control device 50 will be described in detail below.

Figure 2:
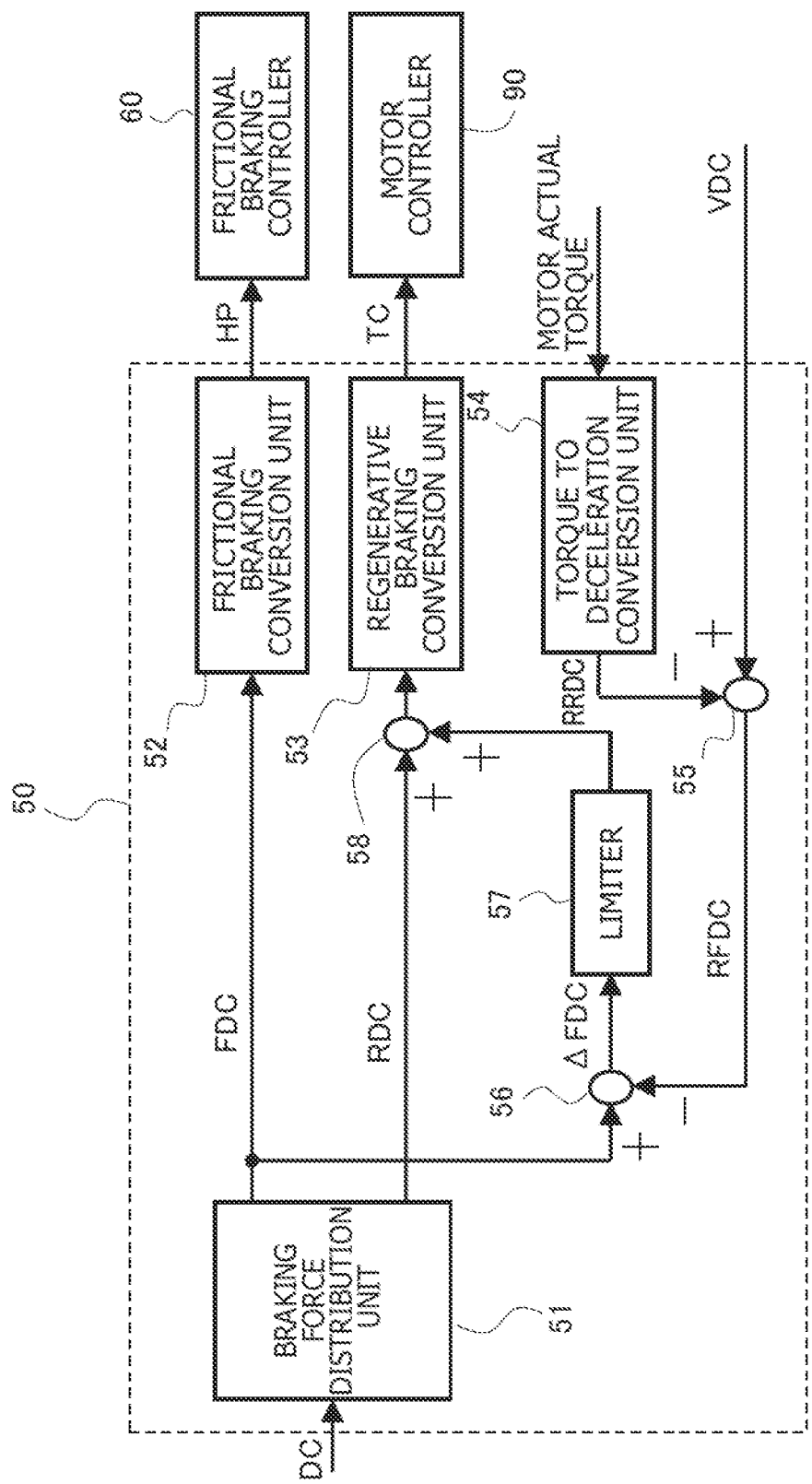
FIG. 2 is a block diagram illustrating a first embodiment of a braking control device.

FIG. 2 is a block diagram illustrating a first embodiment of braking control device 50.

A braking force distribution unit 51 performs distribution of the braking force by a regenerative coordination brake. In the distribution process, braking force distribution unit 51 acquires a deceleration command DC from integrated motion control device 30 and divides the acquired deceleration command DC into a portion to be realized by frictional braking and the other portion, thereby distributing into a deceleration command FDC for frictional braking and a deceleration command RDC for regenerative braking.

Specifically, braking force distribution unit 51 distributes deceleration command DC into deceleration command FDC for frictional braking and deceleration command RDC for regenerative braking so that the sum of deceleration command FDC for frictional braking and deceleration command RDC for regenerative braking is the same as deceleration command DC output by integrated motion control device 30.

Braking force distribution unit 51 variably sets the distribution ratio of deceleration command FDC for frictional braking to deceleration command RDC for regenerative braking based on, for example, the charge state of battery 95.

A frictional braking conversion unit 52 acquires deceleration command FDC for frictional braking from braking force distribution unit 51 and converts deceleration command FDC into a hydraulic pressure command HP (in other words, converts a target deceleration distributed to frictional braking to a target hydraulic pressure).

Frictional braking controller 60 acquires hydraulic pressure command HP as the frictional braking command from braking control device 50, specifically, from frictional braking conversion unit 52.

Frictional braking controller 60 then controls frictional braking force generation device 70 based on the acquired hydraulic pressure command HP to supply a hydraulic pressure corresponding to hydraulic pressure command HP to each wheel cylinder 83 to 86, thereby generating a frictional braking force applied to each wheel 2 to 5 based on hydraulic pressure command HP.

On the other hand, a regenerative braking conversion unit 53 acquires deceleration command RDC for regenerative braking and converts deceleration command RDC into a torque command TC (in other words, converts a target deceleration distributed to regenerative braking to a target torque).

Here, torque command TC is a negative target torque (in other words, a regenerative torque) when making motor generator 91 to perform regenerative running to realize deceleration command RDC.

Motor controller 90 acquires torque command TC as the regenerative braking command from braking control device 50, specifically, from regenerative braking conversion unit 53.

Motor controller 90 then controls the regenerative running of motor generator 91 based on the acquired torque command TC to generate a regenerative braking force applied to wheels 2 and 3.

Here, deceleration command RDC for regenerative braking acquired by regenerative braking conversion unit 53 is a command obtained by correcting deceleration command RDC determined by braking force distribution unit 51 based on a deceleration that is actually generated by frictional braking device 80 in response to deceleration command FDC.

Thus, braking control device 50 is configured so that when the deceleration actually generated by frictional braking device 80 is insufficient with respect to deceleration command FDC due to the uncertainty in achieving deceleration by frictional braking, braking control device 50 modifies deceleration command RDC for regenerative braking so as to compensate for such a shortfall by regenerative braking.

It should be noted that the deceleration actually generated by frictional braking device 80 is a deceleration generated by a frictional braking force depending on characteristics of deceleration with respect to a force acting on friction pad 81 of frictional braking device 80.

Furthermore, the deceleration actually generated by frictional braking device 80 is a deceleration that is being actually generated or a deceleration that is predicted to be able to be generated.

A process of correcting deceleration command RDC for regenerative braking will be described in detail below.

To correct deceleration command RDC for regenerative braking, braking control device 50 includes a torque to deceleration conversion unit 54, a first subtraction unit 55, a second subtraction unit 56, a limiter 57, and an addition unit 58.

Torque to deceleration conversion unit 54 acquires information on the torque (specifically, the regenerative torque) actually generated by motor generator 91 and converts the acquired information on the motor torque into a deceleration RRDC, which is information on the deceleration that is being generated by regenerative braking on vehicle 1.

Thus, deceleration RRDC determined by torque to deceleration conversion unit 54 is a deceleration that is actually being generated by regenerative running of motor generator 91.

Braking control device 50 can estimate the torque that is being actually generated by motor generator 91 from the motor current based on characteristics of motor generator 91, for example, or can acquire information on the motor torque from motor controller 90.

First subtraction unit 55 acquires information on an actual deceleration VDC of the vehicle 1 and information on deceleration RRDC by regenerative braking that is determined by torque to deceleration conversion unit 54.

First subtraction unit 55 then subtracts deceleration RRDC from actual deceleration VDC and outputs the result of subtraction as a deceleration RFDC, which is a deceleration that is being actually generated by frictional braking force.

Thus, in consideration that actual deceleration VDC of the vehicle 1 is achieved by a frictional braking force and a regenerative braking force, what is left after subtracting deceleration RRDC by regenerative braking from actual deceleration VDC of the vehicle 1 is a deceleration that is being actually generated by frictional braking, which is deceleration RFDC.

Braking control device 50 can calculate, as actual deceleration VDC of vehicle 1, an amount of change per unit time in the vehicle speed estimated from the wheel speed determined by motion state sensor 40, for example.

Second subtraction unit 56 acquires information on deceleration command FDC for frictional braking from braking force distribution unit 51 and acquires information on deceleration RFDC (a first deceleration) that is being actually generated by the frictional braking force from first subtraction unit 55.

Second subtraction unit 56 then subtracts deceleration RFDC from deceleration command FDC and outputs the result of subtraction as a deceleration error ΔFDC (a second deceleration).

Deceleration error ΔFDC is a command for correcting deceleration command RDC for regenerative braking as described below.

Here, if deceleration RFDC that is being actually generated by a frictional braking force is the same as deceleration command FDC for frictional braking, deceleration error ΔFDC is zero, which indicates that it is not necessary to correct deceleration command RDC for regenerative braking.

On the other hand, if deceleration command FDC for frictional braking is not being achieved due to the response delay or non-linearity of frictional braking device 80, deceleration error ΔFDC is a deceleration corresponding to a portion that is not being generated by the frictional braking force among deceleration command FDC for frictional braking.

In this case, as described below, braking control device 50 corrects deceleration command RDC for regenerative braking by deceleration error ΔFDC to compensate for the portion that is not achieved of deceleration command FDC for frictional braking.

Limiter 57 has functions of acquiring deceleration error ΔFDC output from second subtraction unit 56 and performing a predetermined output limitation on deceleration error ΔFDC before outputting.

Specifically, limiter 57 limits a temporal change (in other words, a time differential value) of deceleration error ΔFDC or limits deceleration error ΔFDC so as to be equal to or less than an upper limit value.

The process of limiting deceleration error ΔFDC at limiter 57 will be described below in detail.

Addition unit 58 acquires information on deceleration error ΔFDC that has passed through limiter 57 and also acquires information on deceleration command RDC for regenerative braking from braking force distribution unit 51.

Addition unit 58 outputs a result of adding deceleration error ΔFDC to deceleration command RDC to regenerative braking conversion unit 53 as a final deceleration command RDC for regenerative braking.

Thus, when deceleration RFDC that is being actually generated by frictional braking is smaller than deceleration command FDC for frictional braking, braking control device 50 corrects deceleration command RDC for regenerative braking so as to increase, thereby compensating for the shortfall to deceleration command FDC of deceleration RFDC that is being actually generated by frictional braking by regenerative braking.

In the deceleration by frictional braking device 80, deceleration command FDC for frictional braking cannot sometimes be achieved due to the response delay or non-linearity of frictional braking device 80.

Figure 3:
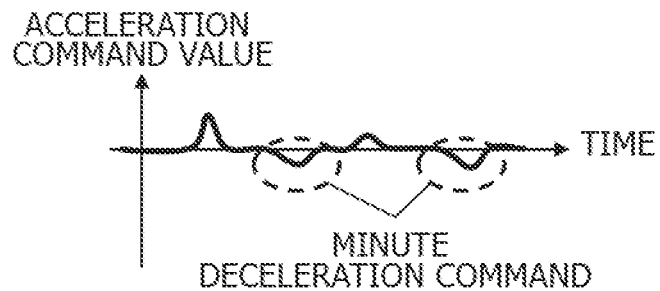
FIG. 3 is a time chart illustrating a situation in which minute acceleration and minute deceleration are repeated in a vehicle.

FIG. 3 illustrates a case in which minute acceleration and deceleration are repeated in vehicle 1, which is travelling at a constant speed, for example. In this case, if there is a response delay to a request for minute deceleration in the deceleration by frictional braking, this results in an error in the deceleration, leading to a decline in the ride quality of vehicle 1.

Figure 4:
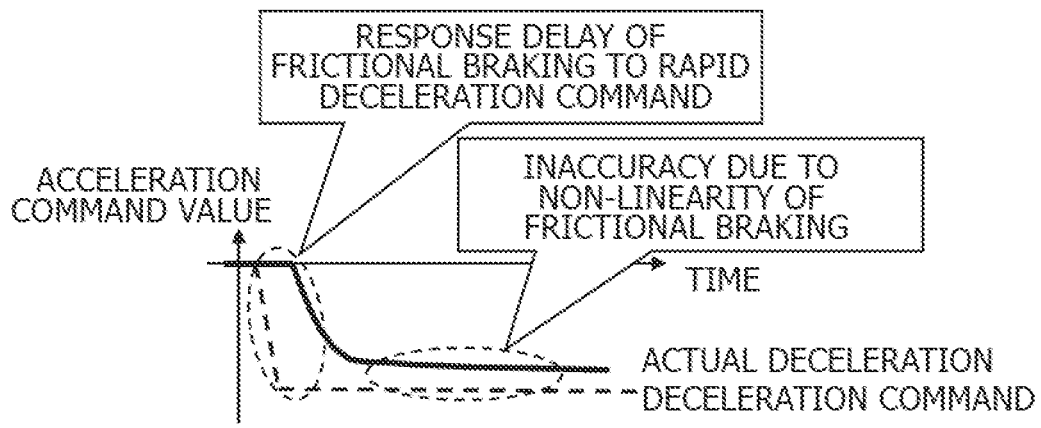
FIG. 4 is a time chart illustrating response delay and non-linearity of a frictional braking force.

FIG. 4 illustrates change in the deceleration by frictional braking in response to a rapid deceleration command.

The response delay of frictional braking device 80 results in a response delay in the rising of the actual deceleration to a rapid deceleration command with an increase rate of the commanded deceleration per unit time exceeding a predetermined value. This leads to an error in the actual deceleration during the time period corresponding to such a response delay.

Furthermore, if a deceleration command of a specific magnitude or greater is continued, the non-linearity of the frictional braking force by frictional braking device 80 may result in a poor accuracy of the hydraulic pressure command for achieving the commanded deceleration, leading to a continuous error in the actual deceleration.

Accordingly, when deceleration command FDC for frictional braking cannot be achieved due to the response delay or non-linearity of frictional braking device 80, braking control device 50 compensates for the shortfall of deceleration RFDC that is being actually generated by frictional braking by regenerative braking, thereby limiting an error in the deceleration the vehicle.

The functions and effects of braking control device 50 will be described in detail below with reference to drawings.

Figure 5:
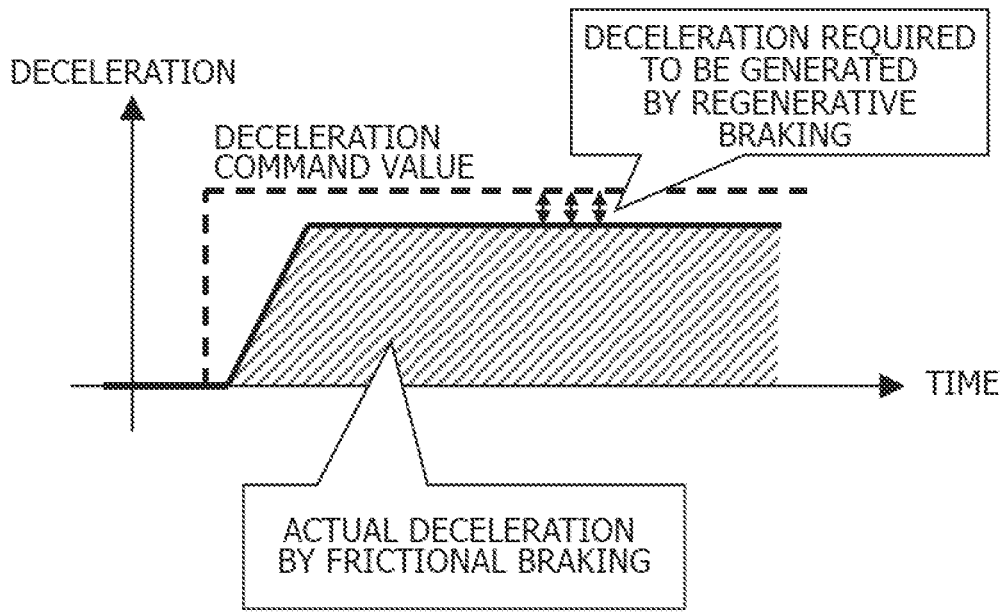
FIG. 5 is a time chart illustrating the correlation between an actual deceleration by frictional braking and deceleration to be generated by regenerative braking.

FIG. 5 is a time chart schematically illustrating the function of compensating for the shortfall of the actual deceleration obtained by frictional braking by regenerative braking.

Braking control device 50 generates a deceleration corresponding to the difference between the deceleration actually generated by a frictional braking force and the deceleration command, that is, the shortfall of the actual deceleration by frictional braking to the deceleration command, by regenerative braking so as to achieve the deceleration command.

Here, it is difficult, due to the non-linear characteristics of the actual deceleration with respect to the hydraulic pressure, to accurately estimate the deceleration actually generated by a frictional braking force from the hydraulic pressure.

In contrast, it is relatively easy to estimate the deceleration actually generated by regenerative braking from the torque generated by motor generator 91. The actual deceleration of vehicle 1 is achieved by the sum of the deceleration by frictional braking and the deceleration by regenerative braking.

Accordingly, braking control device 50 estimates the actual deceleration by frictional braking by subtracting an estimated deceleration by regenerative braking from the actual deceleration of vehicle 1.

Figure 6:
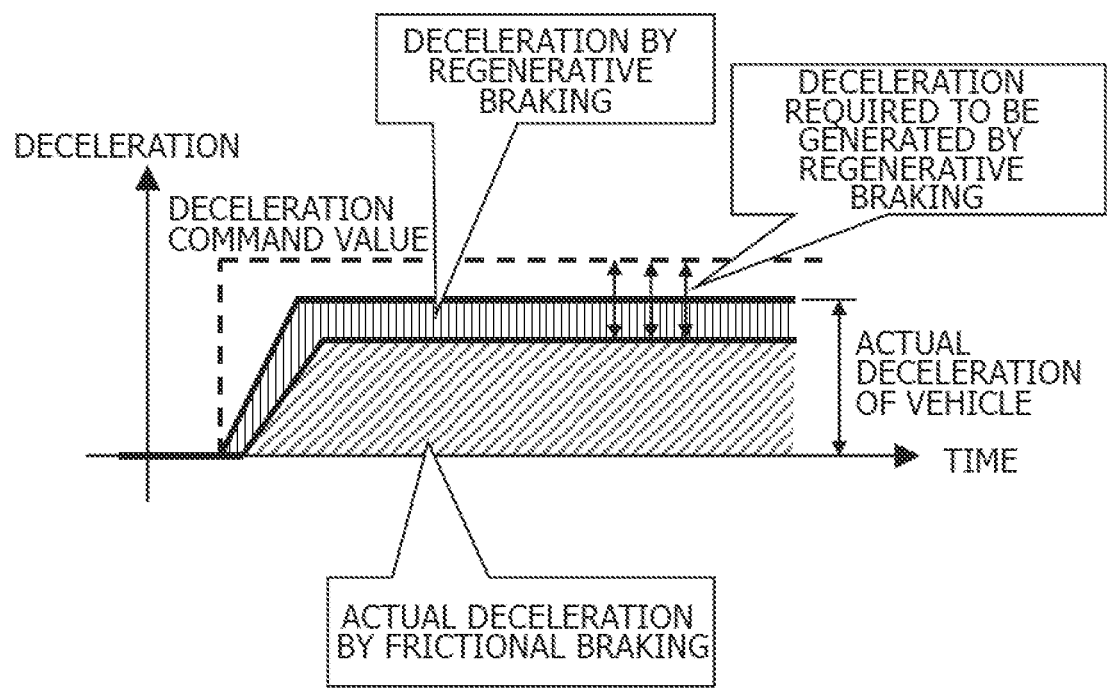
FIG. 6 is a time chart illustrating a method of estimating an actual deceleration by frictional braking.

FIG. 6 is a time chart explaining a process of estimating the actual deceleration by frictional braking.

The actual deceleration of the vehicle is the sum of the deceleration by frictional braking and the deceleration by regenerative braking. Braking control device 50 can estimate an actual deceleration by frictional braking, that is, the deceleration that is being actually generated by frictional braking by subtracting the actual deceleration by regenerative braking from the actual deceleration of the vehicle.

The result of subtracting the estimated value of the actual deceleration by frictional braking from deceleration command DC output by integrated motion control device 30 is the deceleration that is requested to be generated by regenerative braking in order to achieve deceleration command DC.

Furthermore, what is left after subtracting the deceleration that is being actually generated by regenerative braking from the deceleration that is requested to be generated by regenerative braking in order to achieve deceleration command DC is the shortfall of the actual deceleration by frictional braking to deceleration command FDC. Deceleration command DC is achieved by increasing a deceleration by regenerative braking by an amount of this shortfall.

Thus, braking control device 50 compensates for the shortfall to deceleration command FDC of the deceleration RFDC that is being actually generated by frictional braking by regenerative braking, thereby preventing an error in the deceleration from occurring due to the response delay or non-linearity on frictional braking device 80.

This allows compensating for the uncertainty in achieving deceleration by frictional braking, enhancing the accuracy of the actual deceleration with respect to the deceleration command, and improving the ride quality of vehicle 1.

Next, processing by limiter 57 will be described in detail.

Figure 7:
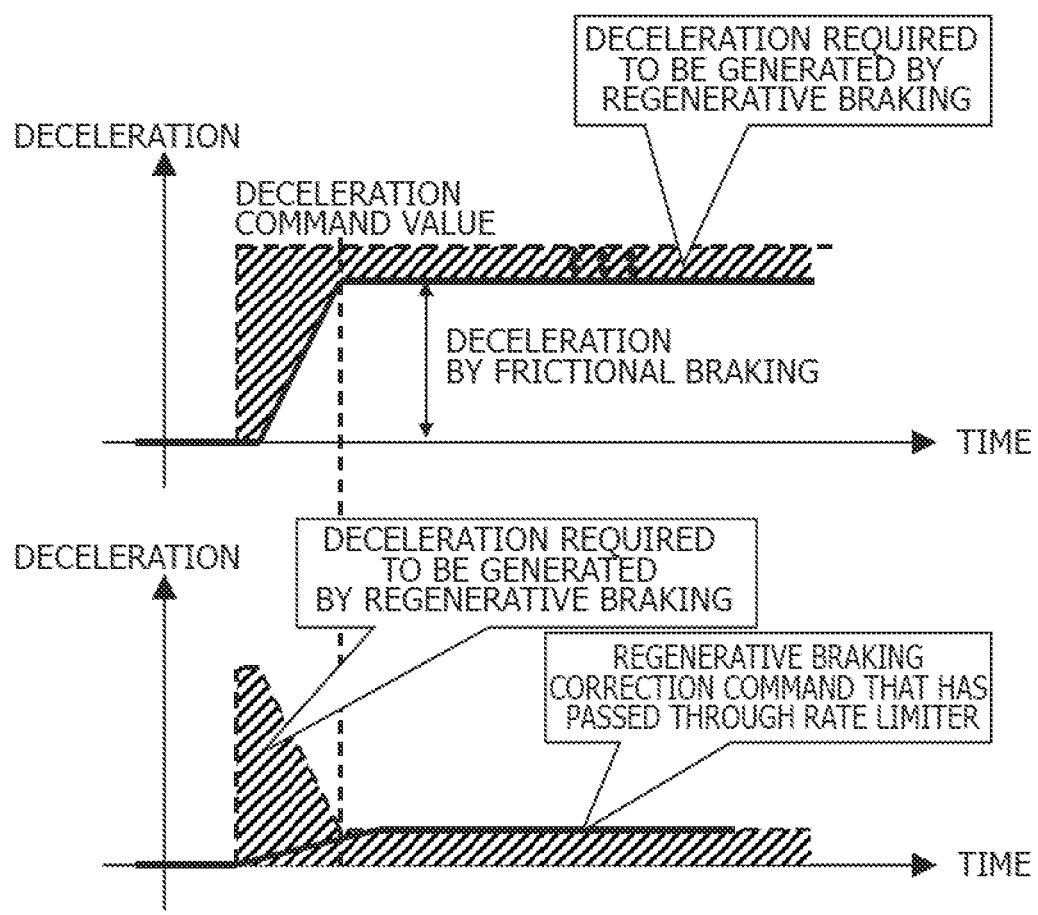
FIG. 7 is a time chart illustrating a function of a rate limiter.

FIG. 7 is a time chart explaining a function of limiter 57 as a rate limiter for limiting a temporal change of deceleration error ΔFDC.

When the deceleration command output by integrated motion control device 30 increases rapidly, which causes a response delay of the frictional braking force, deceleration error ΔFDC increases rapidly, and further, deceleration command RDC for regenerative braking acquired by regenerative braking conversion unit 53 increases rapidly.

Here, in response to a rapid increase in deceleration command RDC for regenerative braking, the regenerative braking force (and further, the deceleration of vehicle 1) rapidly increases due to a relatively high responsiveness of regenerative braking.

If the regenerative braking force suddenly increases, a large amount of torque may be applied to drive shaft 93, or the ride quality of vehicle 1 may decline.

Accordingly, braking control device 50 comprises limiter 57 as a rate limiter for limiting a temporal increase of deceleration error ΔFDC and limits, by limiter 57, the increase amount of deceleration error ΔFDC per unit time so as to be equal to or less than an upper limit value.

Specifically, if an amount increased from the previous value (in other words, an amount increased from a value before a predetermined time) to the current value of deceleration error ΔFDC output from second subtraction unit 56 exceeds an upper limit, limiter 57 outputs a result of adding the upper limit value to the previous value as a current deceleration error ΔFDC. If an amount increased from the previous value (in other words, an amount increased from before a predetermined time) is equal to or less than the upper limit value, limiter 57 makes deceleration error ΔFDC output from second subtraction unit 56 to pass through without modifying.

Thus, by using limiter 57 as a rate limiter for limiting an increase amount of deceleration error ΔFDC per unit time so as to be equal to or less than the upper limit value, even if deceleration error ΔFDC output by second subtraction unit 56 rapidly increases due to response delay of a frictional braking force, a rapid increase in deceleration command RDC for regenerative braking acquired by regenerative braking conversion unit 53 (in other words, a target value of the regenerative braking force, or a target value of the regenerative amount) is suppressed.

Accordingly, even if there is a response delay in the frictional braking force in response to a rapid increase in the deceleration command output by integrated motion control device 30, a rapid increase in the regenerative braking force to compensate for this response delay is suppressed. This allows protecting drive shaft 93 and suppressing decline of the ride quality of vehicle 1.

It should be noted that the limitation by limiter 57 may not be performed with regard to decreasing change in deceleration error ΔFDC.

Figure 8:
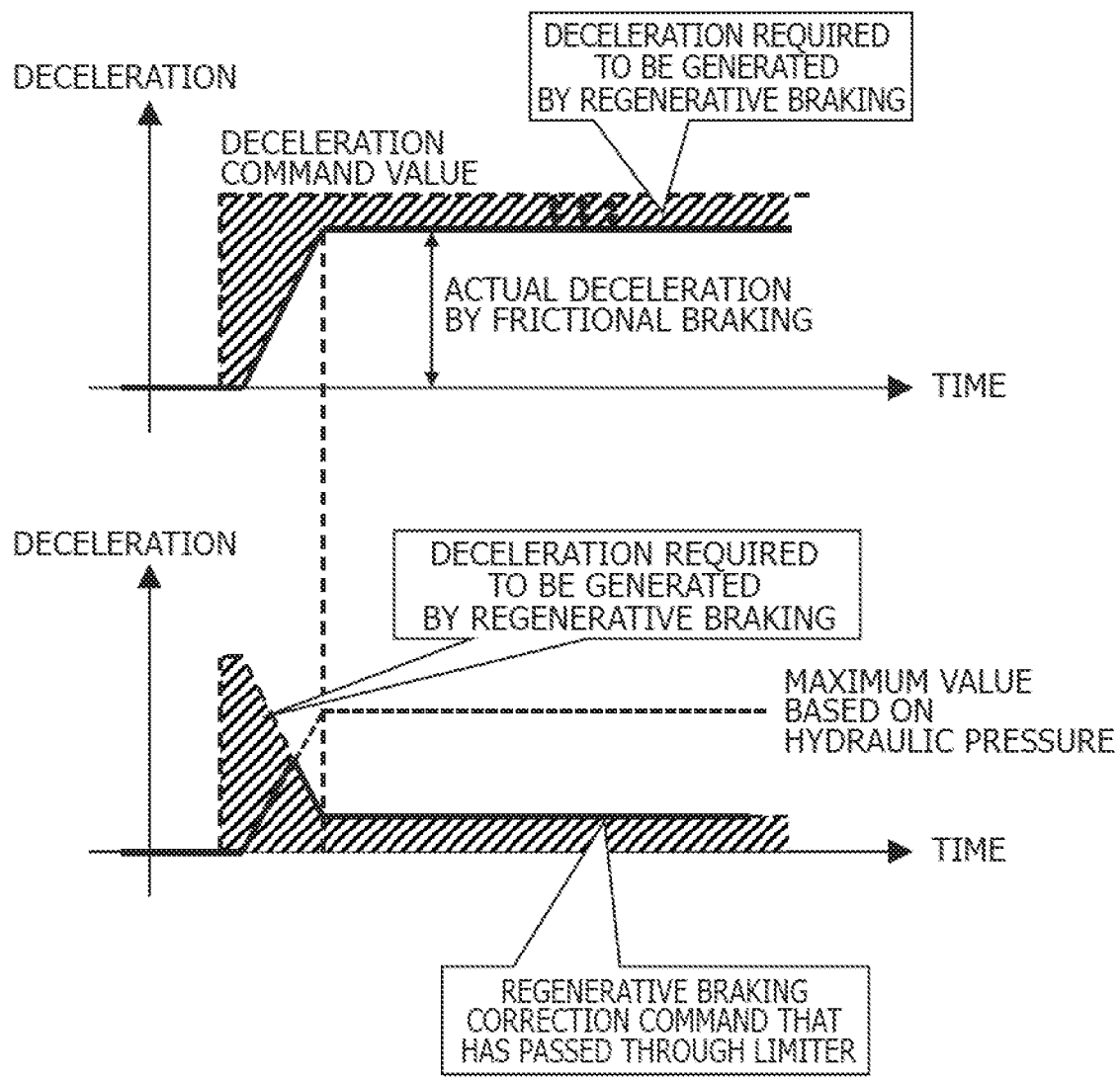
FIG. 8 is a time chart illustrating an effect of an output limitation with a maximum value that is based on a hydraulic pressure.

FIG. 8 is a time chart explaining a function of limiter 57 as a limiter for performing output limitation on deceleration error ΔFDC by a maximum value.

Here, limiter 57 variably sets a maximum value ΔFDCmax (ΔFDCmax>0) of deceleration error ΔFDC based on the hydraulic pressure, which is a force acting on friction pad 81 in frictional braking device 80. As the hydraulic pressure (in other words, frictional braking force) increases, maximum value ΔFDCmax is set to be higher.

In this case, if there is a response delay in the hydraulic pressure in response to a rapid increase in the deceleration command output from integrated motion control device 30, maximum value ΔFDCmax gradually increases depending on such a response delay in the hydraulic pressure. Once the hydraulic pressure reaches a level that corresponds to deceleration command FDC, maximum value ΔFDCmax is maintained at a constant value.

Limiter 57 limits deceleration error ΔFDC so as not to exceed maximum value ΔFDCmax based on the hydraulic pressure.

With such a limiter 57, while maximum value ΔFDCmax gradually increases, that is, while an error in the deceleration by frictional braking is large due to the response delay in the hydraulic pressure, deceleration error ΔFDC output from limiter 57 is limited by maximum value ΔFDCmax, and thereby, deceleration error ΔFDC increases gradually in response to a gradual increase of maximum value ΔFDCmax.

After that, as the hydraulic pressure increases, deceleration error ΔFDC decreases, while maximum value ΔFDCmax increases. Deceleration error ΔFDC thereby passes through limiter 57 without undergoing limitation by limiter 57.

Thus, when limiter 57 is a limiter for limiting deceleration error ΔFDC by a maximum value, even if there is a response delay in the frictional braking force to a rapid increase in the deceleration command output from integrated motion control device 30, a rapid increase in deceleration command RDC for regenerative braking acquired by regenerative braking conversion unit 53 is suppressed.

This results in, when compensating for a response delay in the frictional braking force by regenerative braking, suppressing a rapid increase in the regenerative braking force, protecting drive shaft 93, and suppressing decline of the ride quality of vehicle 1.

Figure 9:
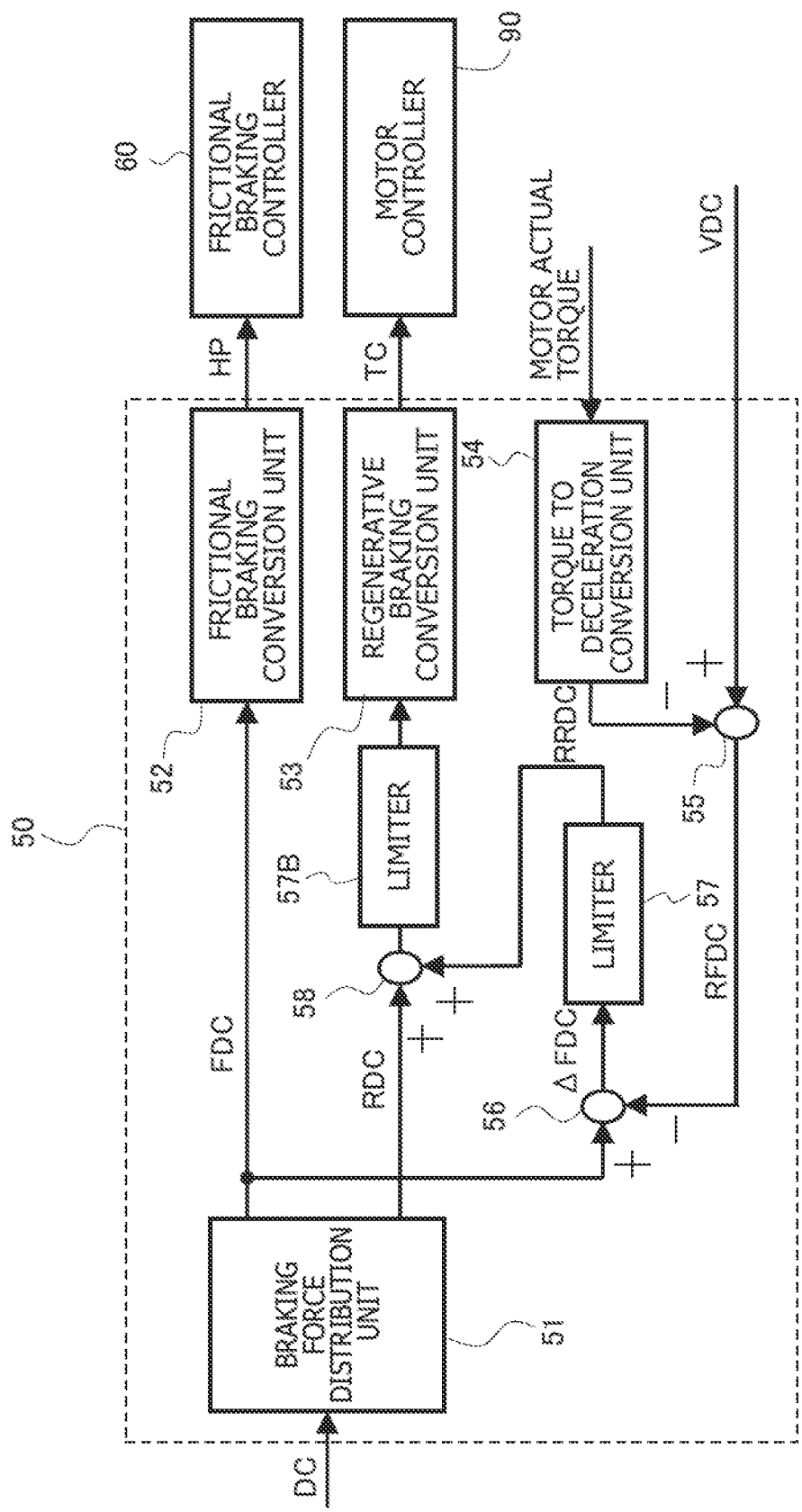
FIG. 9 is a block diagram illustrating a second embodiment of the braking control device.

FIG. 9 is a block diagram illustrating a second embodiment of braking control device 50.

Braking control device 50 shown in FIG. 9 comprises a second limiter 57B for limiting deceleration command RDC for regenerative braking acquired by regenerative braking conversion unit 53 by a maximum value DCmax. Second limiter 57B is provided between addition unit 58 and regenerative braking conversion unit 53.

Second limiter 57B performs output limitation on deceleration command RDC after being corrected by deceleration error ΔFDC at addition unit 58 so as not to exceed a gripping limit of wheels 2 and 3.

Here, second limiter 57B variably sets a maximum value RDCmax of the braking force to be generated for wheels 2 and 3 based on a friction coefficient of the road surface on which vehicle 1 is travelling, a load (in other words, a wheel load) acting on wheels 2 and 3, a turning force, and the like so that slipping of wheels 2 and 3 does not occur beyond their griping limits.

Second limiter 57B limits deceleration command RDC after being corrected by deceleration error ΔFDC at addition unit 58 so as not to exceed maximum value RDCmax.

Figure 10:
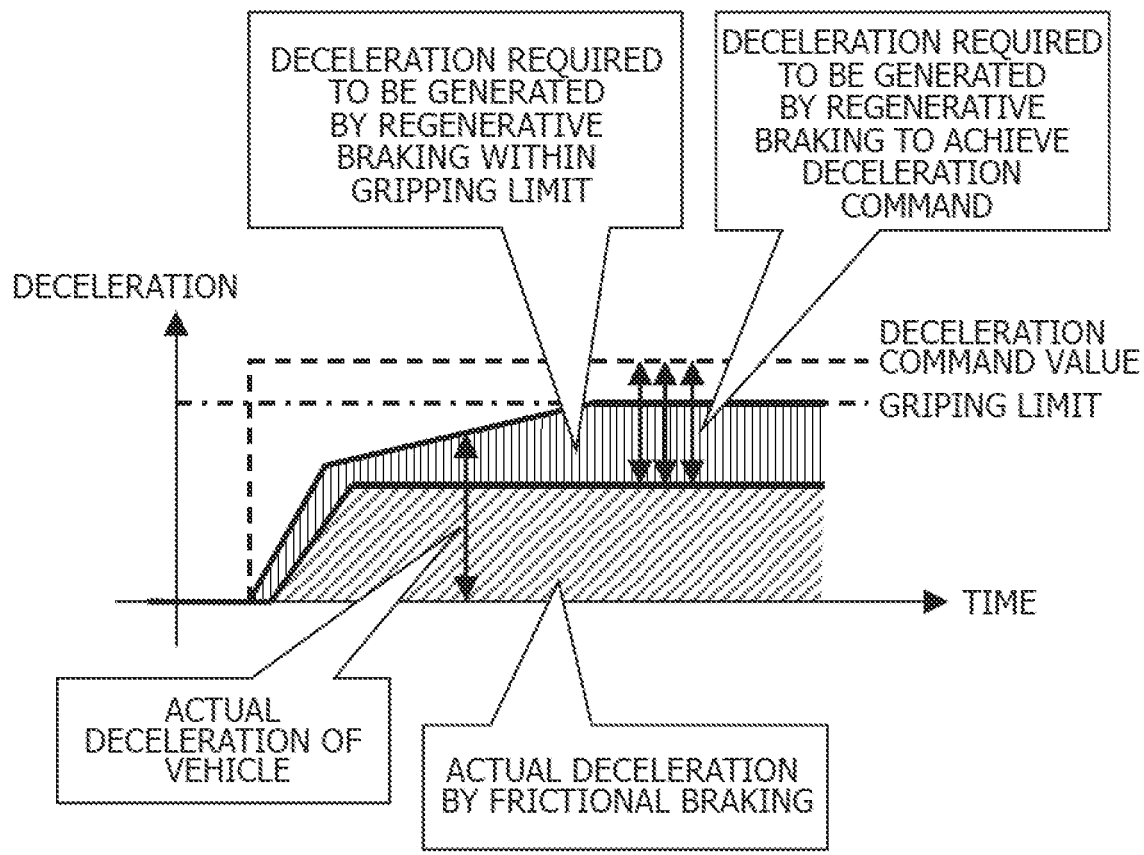
FIG. 10 is a time chart illustrating an effect of an output limitation based on a gripping limit.

FIG. 10 is a time chart for explaining an effect of limiting by second limiter 57B.

When the sum of deceleration command RDC that has passed through addition unit 58 and deceleration RFDC that is being actually generated by frictional braking force exceeds maximum value DCmax, second limiter 57B outputs a reduced deceleration command RDC so that the sum is equal to or less than maximum value DCmax.

On the other hand, if the sum of deceleration command RDC that has passed through addition unit 58 and deceleration RFDC that is being actually generated by frictional braking force is equal to or less than maximum value DCmax, second limiter 57B outputs deceleration command RDC that has passed through addition unit 58 without modifying.

The process of limiting deceleration command RDC at second limiter 57B allows a regenerative braking force to be generated within a range that can prevent wheels 2 and 3 from slipping beyond their gripping limits.

Figure 11:
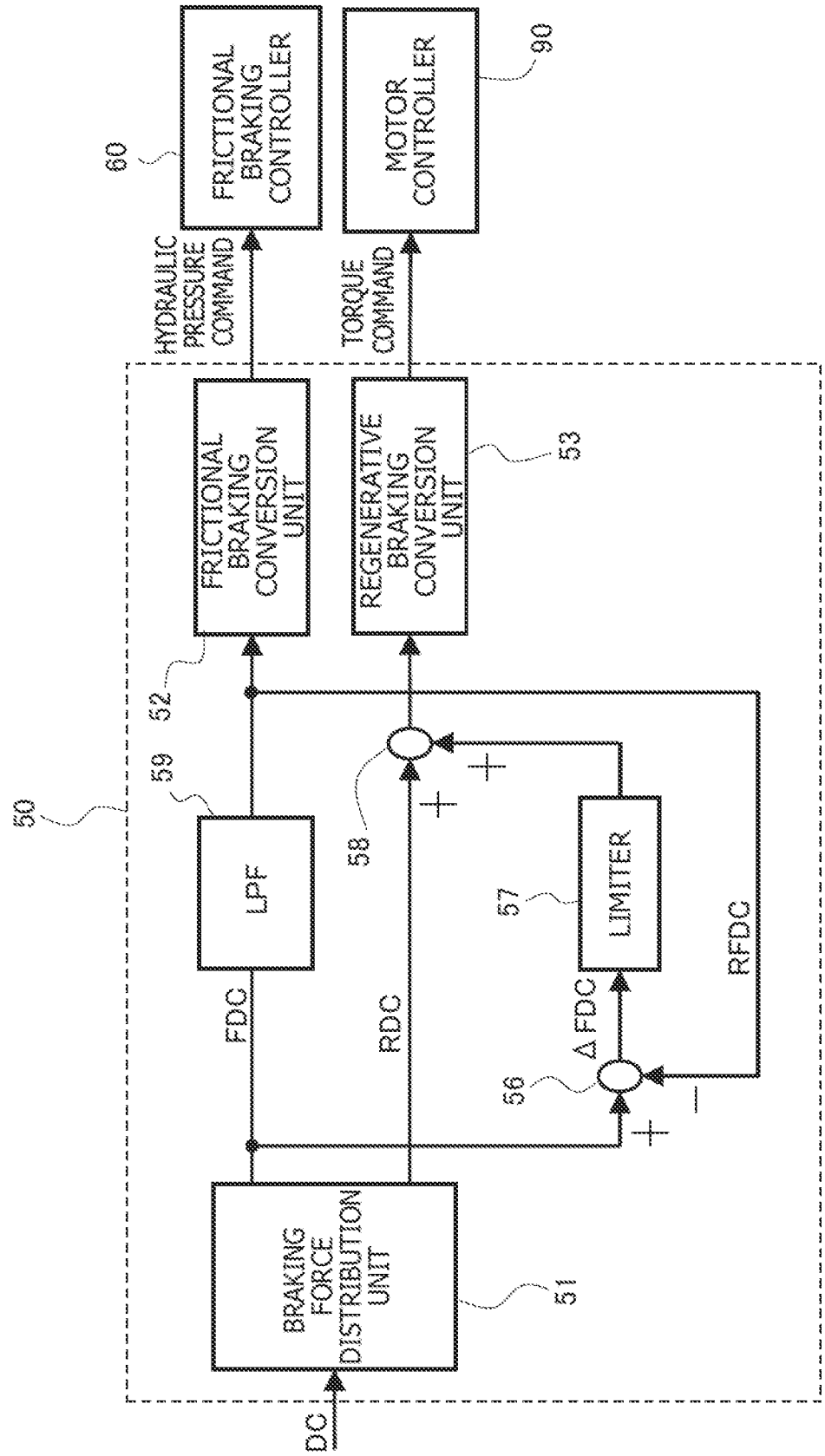
FIG. 11 is a block diagram illustrating a third embodiment of the braking control device.

FIG. 11 is a block diagram illustrating a third embodiment of braking control device 50.

Braking control device 50 shown in FIG. 2 or FIG. 9 estimates the deceleration that is being actually generated by frictional braking device 80 by subtracting actual deceleration RRDC by regenerative braking from deceleration VDC of the vehicle.

On the other hand, braking control device 50 in FIG. 11 determines a deceleration that is predicted to be able to be generated by frictional braking device 80 and obtains the difference between the predicted deceleration and deceleration command FDC for frictional braking as deceleration error ΔFDC.

In FIG. 11, a low-pass filter 59 acquires deceleration command FDC for frictional braking set by braking force distribution unit 51 and allows a low frequency component with a frequency that is lower than a cutoff frequency, among the components of the acquired deceleration command FDC, to pass through.

Frictional braking conversion unit 52 then acquires a deceleration command $FDC_{LP}$, which has passed through low-pass filter 59 and converts deceleration command $FDC_{LP}$ into hydraulic pressure command HP.

Here, the cutoff frequency of low-pass filter 59 is adapted based on a response delay of frictional braking device 80 so that deceleration command $FDC_{LP}$ that can be followed by frictional braking device 80 is output from low-pass filter 59.

Thus, deceleration command $FDC_{LP}$ responds transiently so as to approximate to the actual deceleration by frictional braking. Even if there is a response delay of frictional braking device 80, deceleration command $FDC_{LP}$ is a deceleration (first deceleration) that is predicted to be generated by frictional braking device 80 in a transient state.

Second subtraction unit 56 subtracts deceleration command $FDC_{LP}$ from deceleration command FDC for frictional braking set by the braking force distribution unit 51 and obtains deceleration error ΔFDC (in other words, a corrected value of deceleration command RDC for regenerative braking), which corresponds to the shortfall of frictional braking force.

Here, the difference between deceleration command FDC for frictional braking set by braking force distribution unit 51 and deceleration command $FDC_{LP}$ corresponds to a component cut by low-pass filter 59, in other words, a portion corresponding to a response delay of frictional braking device 80 among deceleration command FDC.

Deceleration error ΔFDC determined by second subtraction unit 56 is acquired by addition unit 58 via limiter 57.

As described above, limiter 57 limits change in deceleration error ΔFDC or limits deceleration error ΔFDC to be equal to or less than the maximum value that is based on the hydraulic pressure and the gripping limit of tires.

Addition unit 58 adds deceleration error ΔFDC that has passed through limiter 57 to deceleration command RDC for regenerative braking determined by braking force distribution unit 51 and outputs the result of addition as a final deceleration command RDC for regenerative braking.

Thus, braking control device 50 corrects deceleration command RDC for regenerative braking so as to increase by deceleration error ΔFDC, which is based on a portion corresponding to a response delay of frictional braking device 80 among deceleration command FDC, thereby compensating for the shortfall of frictional braking force due to the response delay by the increased regenerative braking force.

Figure 12:
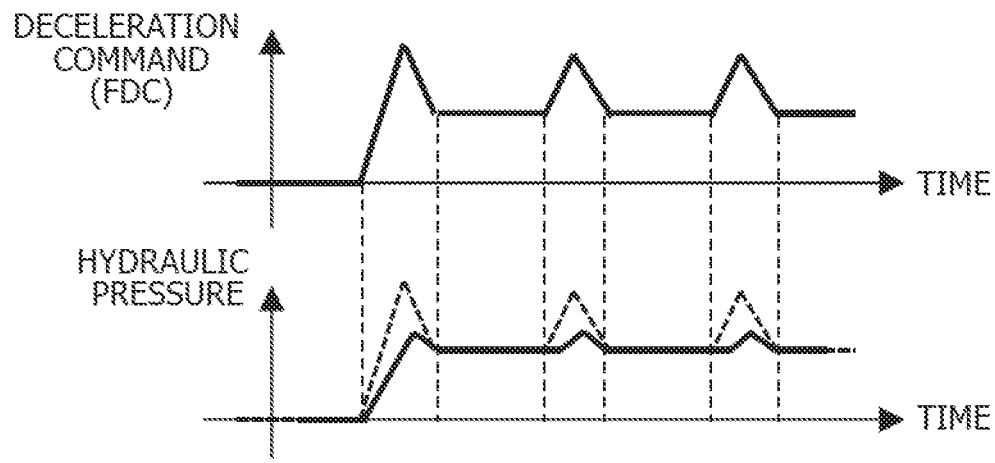
FIG. 12 is a time chart illustrating response delay of a frictional braking force (in other words, hydraulic pressure) with respect to a request for minute deceleration.

FIG. 12 is a time chart illustrating change in a hydraulic pressure that is actually obtained in response to deceleration command FDC when the hydraulic pressure is controlled by braking control device 50 according to deceleration command FDC for frictional braking.

FIG. 12 shows a situation in which varying of the hydraulic pressure in response to change in deceleration command FDC is suppressed due to a response delay of frictional braking device 80 and in which the hydraulic pressure corresponding to deceleration command FDC cannot be obtained.

Figure 13:
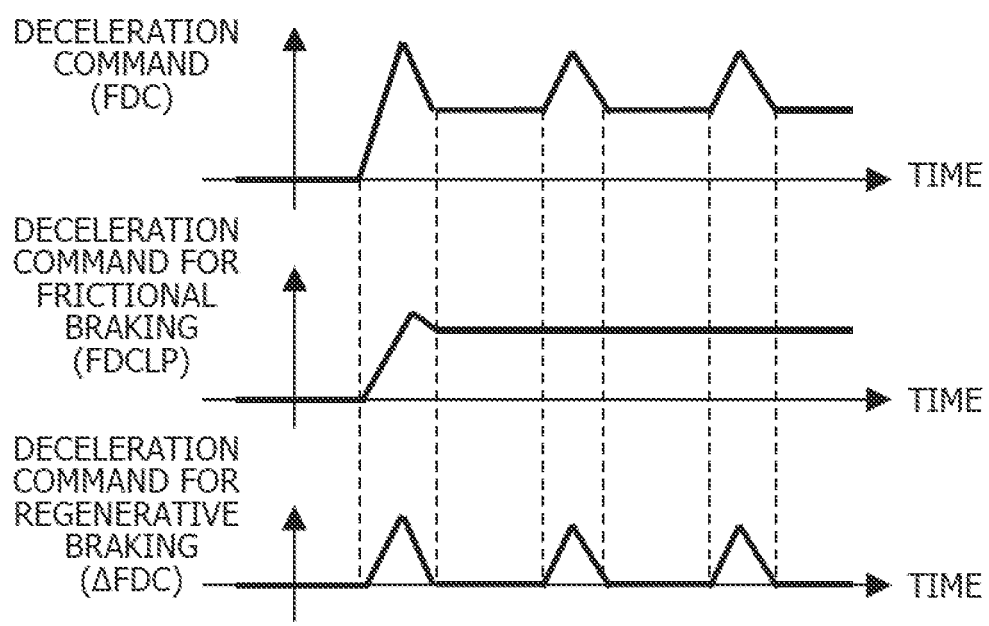
FIG. 13 is a time chart illustrating characteristics of braking control using a low-pass filter.

On the other hand, FIG. 13 is a time chart illustrating a correlation among deceleration command FDC for frictional braking set by braking force distribution unit 51, deceleration command $FDC_{LP}$ obtained after processing deceleration command FDC at low-pass filter 59, and deceleration error ΔFDC (in other words, a corrected value of deceleration command RDC for regenerative braking).

Here, deceleration command $FDC_{LP}$ can change in such a manner that frictional braking device 80 can respond to without delay, thereby substantially realizing the hydraulic pressure varying corresponding to deceleration command $FDC_{LP}$.

However, deceleration command $FDC_{LP}$ causes a shortfall to deceleration command FDC for frictional braking set by braking force distribution unit 51.

If such a shortfall is not compensated for, there will be an error in the deceleration obtained on the vehicle 1 with respect to deceleration command DC output from integrated motion control device 30.

Accordingly, braking control device 50 in FIG. 11 corrects deceleration command RDC for regenerative braking by deceleration error ΔFDC so as to compensate for the shortfall of deceleration command $FDC_{LP}$ to deceleration command FDC for frictional braking, in other words, the response delay of frictional braking device 80, by regenerative braking device 96.

Accordingly, it is possible, even if there is a response delay of frictional braking device 80, to achieve deceleration following change in deceleration command DC output from integrated motion control device 30.

Figure 14:
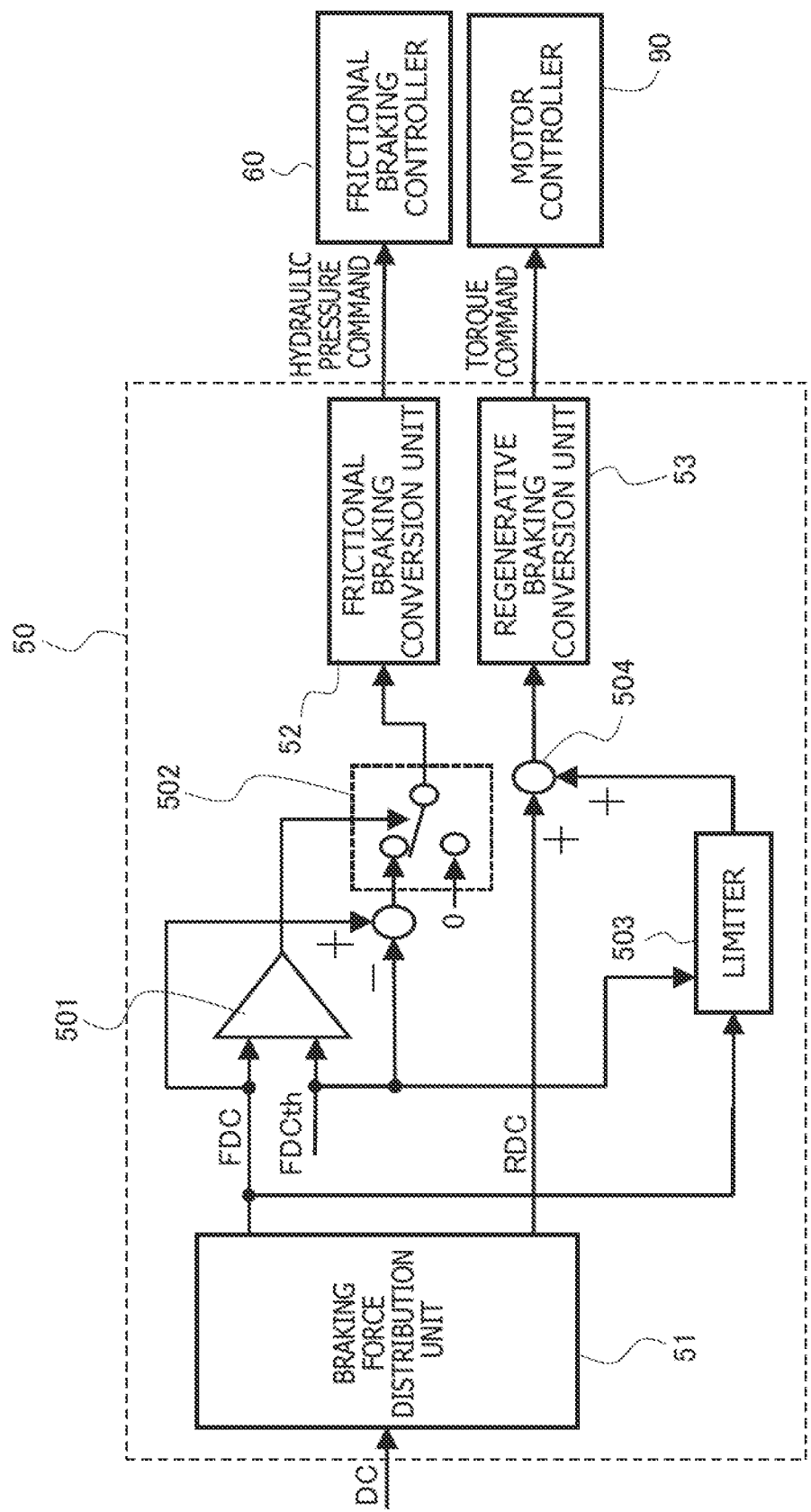
FIG. 14 is a block diagram illustrating a fourth embodiment of the braking control device.

FIG. 14 is a block diagram illustrating a fourth embodiment of braking control device 50.

When a frequent and minute deceleration is repeated in vehicle 1, it is difficult to make a frictional braking force by frictional braking device 80 to vary following such deceleration requests due to a response delay in the frictional braking force by frictional braking device 80, which results in an error in the deceleration.

On the other hand, regenerative braking device 96 exhibits a sufficiently smaller response delay than frictional braking device 80. When a frequent and minute deceleration is repeated in vehicle 1, it is possible to make the regenerative braking force vary following such deceleration requests with a high responsiveness.

Accordingly, braking control device 50 shown in FIG. 14 determines a portion in excess of a threshold among deceleration command FDC for frictional braking set by braking force distribution unit 51 as a deceleration that is predicted to be able to be generated by frictional braking device 80 and compensates for a portion not exceeding the threshold among deceleration command FDC for frictional braking by regenerative braking.

Thus, when a frequent and minute deceleration is repeated in vehicle 1, braking control device 50 shown in FIG. 14 realizes such deceleration requests mainly by regenerative braking.

In other words, braking control device 50 shown in FIG. 14 estimates, based on command of a minute deceleration that is lower than a predetermined deceleration, a deceleration generated by frictional braking force and corrects deceleration command RDC for regenerative braking based on the estimated result.

The configuration of braking control device 50 shown in FIG. 14 will be described in detail below.

A comparison unit 501 compares deceleration command FDC for frictional braking set by braking force distribution unit 51 with a threshold FDCth.

Threshold FDCth is a value set based on a maximum value of deceleration command FDC for frictional braking when a minute deceleration is repeated in vehicle 1.

A switching unit 502 has a function of outputting to frictional braking conversion unit 52 either a deceleration command FDCC that is a result of subtracting threshold FDCth from deceleration command FDC or zero based on the comparison result obtained at comparison unit 501.

If comparison unit 501 outputs a signal indicating that deceleration command FDC exceeds threshold FDCth (that is, a signal indicating that FDC>FDCth), switching unit 502 outputs deceleration command FDCC as a deceleration that is predicted to be able to be generated by frictional braking device 80 (first deceleration).

On the other hand, if comparison unit 501 outputs a signal indicating that deceleration command FDC is equal to or less than threshold FDCth (that is, a signal indicating that FDC≤FDCth), switching unit 502 outputs zero.

Thus, comparison unit 501 and switching unit 502 determine a portion in excess of threshold FDCth among deceleration command FDC as the deceleration that is predicted to be able to be generated by frictional braking device 80 and provide such deceleration command to frictional braking conversion unit 52.

On the other hand, limiter 503 limits deceleration command FDC for frictional braking set by braking force distribution unit 51 so as to be equal to or less than threshold FDCth before outputting to addition unit 504.

Thus, limiter 503 cuts a portion in excess of threshold FDCth, which is used as an upper limit, among deceleration command FDC for frictional braking before making the command to pass through.

Addition unit 504 adds deceleration command FDC that is limited to be equal to or less than threshold FDCth by limiter 503 to deceleration command RDC for regenerative braking set by braking force distribution unit 51 and outputs the result of addition to regenerative braking conversion unit 53.

Thus, braking control device 50 corrects deceleration command RDC so as to increase so that a portion that is not generated by frictional braking among deceleration command FDC (that is, a portion that does not exceed threshold FDCth) is generated instead by regenerative braking device 96.

Figure 15:
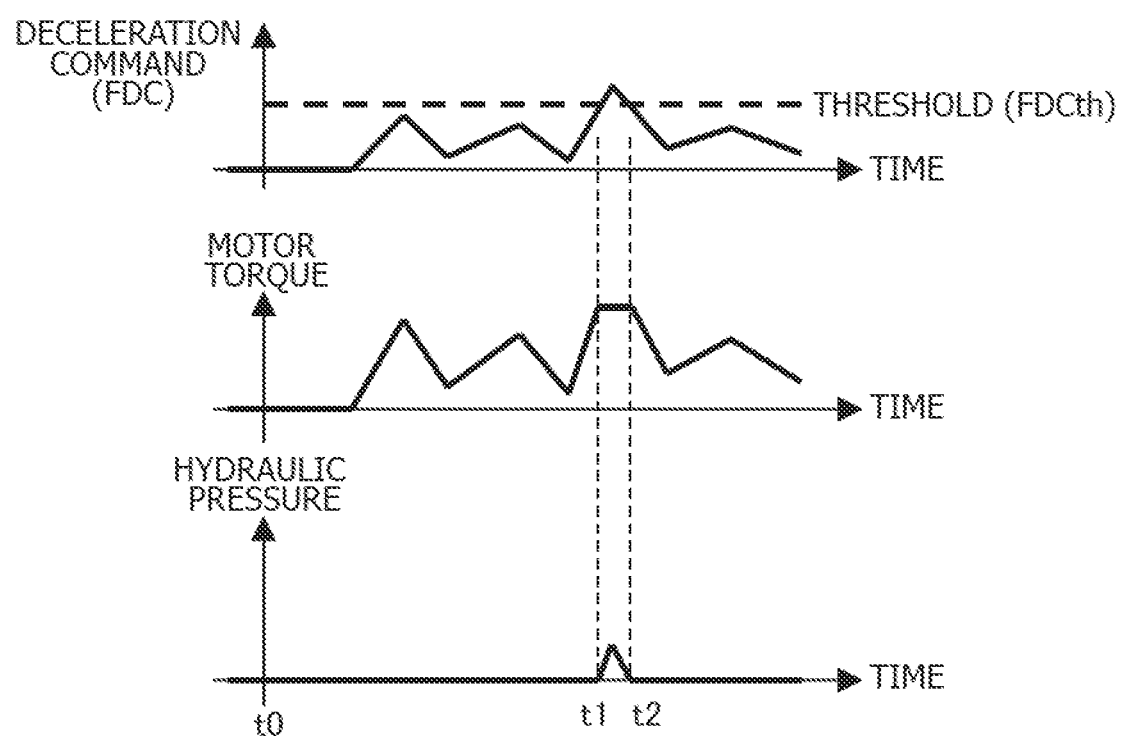
FIG. 15 is a time chart illustrating characteristics of braking control by the braking control device according to the fourth embodiment.

FIG. 15 is a time chart explaining a function of braking control device 50 in FIG. 14 and shows deceleration command FDC, a motor torque (in other words, regenerative braking force) and a hydraulic pressure (in other words, frictional braking force) in a situation in which a frequent and minute deceleration is repeated in vehicle 1.

When deceleration command FDC is equal to or less than threshold FDCth (between time t0 and time t1, and after time t2 in FIG. 15), deceleration command FDC is maintained at zero, and deceleration command FDC that does not exceed threshold FDCth is generated by regenerative braking.

On the other hand, when deceleration command FDC exceeds threshold FDCth (between time t1 and time t2 in FIG. 15), a portion in excess of threshold FDCth among deceleration command FDC is generated by frictional braking, and a portion not exceeding threshold FDCth among deceleration command FDC is generated by regenerative braking, thereby making frictional braking and regenerative braking to share the fulfillment of deceleration command FDC.

In such a configuration, when a frequent and minute deceleration is repeated in vehicle 1, a request for such deceleration is realized by regenerative braking with a relatively high responsiveness, and thereby, a braking force can be generated responsively to requests for such deceleration.

This allows suppressing an error in the deceleration and improving the ride quality of vehicle 1 much more than when handling requests for a repeated minute deceleration by frictional braking with a poor responsiveness.

The technical ideas described in the above embodiments may be used in any appropriate combination as long as they do not conflict with each other.

Although the present invention is specifically described above with reference to a preferred embodiment, it is apparent to one skilled in the art that variations of the embodiment can be made based on the basic technical concept and the teachings of the present invention.

Braking control device 50 may be configured not to comprise braking force distribution unit 51.

When braking control device 50 does not comprise braking force distribution unit 51, braking control device 50 may estimate the first deceleration generated by frictional braking force and control a regenerative braking force based on the second deceleration, which is obtained by subtracting the first deceleration from deceleration command DC.

REFERENCE SYMBOL LIST

1 Vehicle
50 Braking control device (vehicle control device, control unit, controller)
60 Frictional braking controller
70 Frictional braking force generation device
80 Frictional braking device
81 Friction pad
82 Disc rotor
83 to 86 Wheel cylinder
90 Motor controller
91 Motor generator
94 Inverter
95 Battery
96 Regenerative braking device
100 Vehicle control system

The invention claimed is:

1. A vehicle control device provided in a vehicle that has a regenerative braking device for regenerating a regenerative braking force applied to wheels, and a frictional braking device for generating a frictional braking force applied to the wheels, the vehicle control device comprising a control unit for outputting a result of calculation based on input information, wherein the control unit is configured to
estimate, in response to a deceleration command to the vehicle, a first deceleration generated by the frictional braking force based on characteristics of deceleration with respect to a force acting on a friction pad of the frictional braking device,
determine a second deceleration by subtracting the first deceleration from the deceleration command,
output a first command for generating the frictional braking force based on the deceleration command, and
output a second command for generating the regenerative braking force based on the second deceleration, wherein
the control unit estimates the first deceleration by subtracting an estimated deceleration that is being generated by the regenerative braking force from the deceleration of the vehicle.

2. The vehicle control device according to claim 1, wherein the control unit estimates, in response to the deceleration command to the vehicle, a first deceleration that is being generated by the frictional braking force based on characteristics of deceleration with respect to a force acting on the friction pad of the frictional braking device.

3. The vehicle control device according to claim 2, wherein the control unit provides a predetermined output limitation before outputting the second command.

4. The vehicle control device according to claim 2, wherein the control unit provides an output limitation by a maximum value that is based on a force acting on the friction pad before outputting the second command.

5. The vehicle control device according to claim 2, wherein the control unit provides an output limitation so as not to exceed a gripping limit of the wheels before outputting the second command.

6. The vehicle control device according to claim 1, wherein the control unit estimates, in response to the deceleration command to the vehicle, a first deceleration that can be generated by the frictional braking force based on characteristics of deceleration with respect to a force acting on the friction pad of the frictional braking device.

7. The vehicle control device according to claim 6, wherein the control unit makes the deceleration command to pass through a low-pass filter to obtain a low frequency component and estimates the low frequency component as the first deceleration.

8. The vehicle control device according to claim 6, wherein the control unit estimates a portion in excess of a predetermined threshold among the deceleration command as the first deceleration.

9. The vehicle control device according to claim 1, wherein the deceleration command is a command distributed to frictional braking obtained by distribution of braking force to be generated by a regenerative coordination brake.

10. The vehicle control device according to claim 1, wherein characteristics of deceleration with respect to a force acting on the friction pad results from that the deceleration command is a command of a minute deceleration that is lower than a predetermined deceleration.

11. The vehicle control device according to claim 1, wherein characteristics of deceleration with respect to a force acting on the friction pad results from that the deceleration command is a command of a rapid deceleration with an increase rate of deceleration per unit time exceeding a predetermined value.

12. The vehicle control device according to claim 1, wherein characteristics of deceleration with respect to a force acting on the friction pad results from non-linearity of the frictional braking force.

13. A vehicle control method for a vehicle comprising a regenerative braking device for regenerating a regenerative braking force applied to wheels, and a frictional braking device for generating a frictional braking force applied to the wheels, the method comprising:
estimating, in response to a deceleration command to the vehicle, a first deceleration generated by the frictional braking force based on characteristics of deceleration with respect to a force acting on a friction pad of the frictional braking device,
determining a second deceleration by subtracting the first deceleration from the deceleration command,
outputting a first command for generating the frictional braking force based on the deceleration command, and
outputting a second command for generating the regenerative braking force based on the second deceleration, wherein
the control unit estimates the first deceleration by subtracting an estimated deceleration that is being generated by the regenerative braking force from the deceleration of the vehicle.

14. A vehicle control system comprising a regenerative braking device for regenerating a regenerative braking force applied to wheels, a frictional braking device for generating a frictional braking force applied to the wheels, and a controller, wherein the controller is configured to
estimate, in response to a deceleration command to the vehicle, a first deceleration generated by the frictional braking force based on characteristics of deceleration with respect to a force acting on a friction pad of the frictional braking device, determine a second deceleration by subtracting the first deceleration from the deceleration command, output a first command for generating the frictional braking force based on the deceleration command, and output a second command for generating the regenerative braking force based on the second deceleration, wherein the control unit estimates the first deceleration by subtracting an estimated deceleration that is being generated by the regenerative braking force from the deceleration of the vehicle.

* * * * *